US008487501B2

(12) United States Patent
Oka et al.

(10) Patent No.: US 8,487,501 B2
(45) Date of Patent: Jul. 16, 2013

(54) ARMATURE OF ELECTRIC MOTOR

(75) Inventors: Keiichiro Oka, Chiyoda-ku (JP);
Hiroyuki Akita, Chiyoda-ku (JP);
Toshio Arai, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 158 days.

(21) Appl. No.: 13/144,523

(22) PCT Filed: Mar. 2, 2010

(86) PCT No.: PCT/JP2010/001393
§ 371 (c)(1),
(2), (4) Date: Jul. 14, 2011

(87) PCT Pub. No.: WO2010/100890
PCT Pub. Date: Sep. 10, 2010

(65) Prior Publication Data
US 2011/0273053 A1    Nov. 10, 2011

(30) Foreign Application Priority Data

Mar. 6, 2009  (JP) ................ 2009-053621

(51) Int. Cl.
*H02K 49/02* (2006.01)
(52) U.S. Cl.
USPC .......................................... 310/215
(58) Field of Classification Search
USPC .................. 310/215, 214, 216.105
See application file for complete search history.

(56) References Cited

U.S. PATENT DOCUMENTS 6,657,352 B1   12/2003   Asao et al.
6,717,316 B2    4/2004   Asao et al.
(Continued)

FOREIGN PATENT DOCUMENTS

EP   0748025 A2   11/1996
JP   6-153432 A    5/1994
(Continued)

OTHER PUBLICATIONS

International Search Report (PCT/ISA/210) issued on May 18, 2010, by Japanese Patent Office as the International Searching Authority for International Application No. PCT/JP2010/001393.
(Continued)

*Primary Examiner* — Nguyen N Hanh
(74) *Attorney, Agent, or Firm* — Buchanan Ingersoll & Rooney PC

(57) ABSTRACT

An object of the invention is to provide an armature of an electric motor that provides a maximum of space for winding without causing an increase of the magnetic resistance and reduction of the coil space factor. The armature of the electric motor includes a stator yoke 5 of a stator core 1 wherein a plurality of the stator cores 1 forms a substantially annular shape; and a film insulator 4 formed corresponding to a tooth 6 and a stator yoke 5 of the tooth 6, shoes 2*b* and 3*b* being provided at locations corresponding to both side ends of a front portion of a protrusion 6*a* of the tooth 6, the film insulator 4 being fittingly fixed to grooves 2*c* and 3*c* by its being sandwiched between a connection-side insulator 2 and an opposite-side-of-connection insulator 3, the insulators 2 and 3 having grooves 2*c* and 3*c* at roots of the shoes 2*b* and 3*b*, respectively, along both side ends 6*b* of the front portion of the tooth 6.

10 Claims, 15 Drawing Sheets

U.S. PATENT DOCUMENTS

| | | | |
|---|---|---|---|
| 8,076,819 B2 * | 12/2011 | Taema | 310/215 |
| 2002/0047486 A1 | 4/2002 | Asao et al. | |
| 2006/0022550 A1 * | 2/2006 | Otsuji | 310/216 |
| 2006/0279146 A1 * | 12/2006 | Ishigami et al. | 310/71 |
| 2007/0222324 A1 * | 9/2007 | Fukui et al. | 310/215 |

FOREIGN PATENT DOCUMENTS

| | | |
|---|---|---|
| JP | 7-036561 U | 7/1995 |
| JP | 9056099 A | 2/1997 |
| JP | 11-341747 A | 12/1999 |
| JP | 2000-060046 A | 2/2000 |
| JP | 2001-112205 A | 4/2001 |
| JP | 2001-186729 A | 7/2001 |
| JP | 2003-299289 A | 10/2003 |
| JP | 2004-194413 A | 7/2004 |
| JP | 2008-167518 A | 7/2008 |
| JP | 2008-206322 A | 9/2008 |

OTHER PUBLICATIONS

Chinese Official Action dated Jan. 5, 2013 issued in the corresponding Chinese Patent Application No. 2010800055413 and English-language translation (13 pages).

Japanese Office Action (Notification of Reason for Refusal) dated Aug. 21, 2012, issued in corresponding Japanese Patent Application No. 2011-502641. (6 pages).

* cited by examiner

ARMATURE OF ELECTRIC MOTOR

TECHNICAL FIELD

The present invention relates to an armature of an electric motor.

BACKGROUND ART

In an armature of a conventional electric motor, a coil-mounting tooth of a stator core has stepped surfaces at locations where a predetermined length portion of the tooth is narrowed from both its end surfaces in the axial direction of the stator core, whereby an insulator is fittingly fixed and a winding space is maximally provided (refer to Patent Document 1 and Patent Document 2, for example).

In another example, an insulator is fixed to both ends of a stator core without having a narrowed tooth as in the above description. A film insulator is disposed to provide insulation within a slot, and a folded portion of the insulator, where the insulator partially protrudes toward the inside of the slot, is provided to control the film insulator in the axial direction (refer to Patent Document 3, for example).

RELATED ART DOCUMENT

Patent Document

[Patent Document 1]
Japanese Unexamined Patent Application Publication No. 2001-112205 (paragraphs 0027 and 0028, and FIG. 1)
[Patent Document 2]
Japanese Unexamined Patent Application Publication No. 2003-299289 (paragraph 0021, and FIG. 5)
[Patent Document 3]
Japanese Unexamined Patent Application Publication No. 2004-194413 (paragraph 0022, and FIG. 5)

SUMMARY OF THE INVENTION

Problems that the Invention is to Solve

In the armatures of the conventional electric motors, however, a problem is that the tooth, which has the portion narrowed by providing the stepped surfaces in order to fittingly fix the insulator to the tooth, causes an increase in magnetic resistance that accompanies the reduced cross section of the tooth. Another problem is that a protrusion toward the inside of the insulator slot, for controlling an insulation material in the axial direction reduces the coil winding space, thus causing reduction of the coil space factor.

The present invention is directed to overcome the above described problems, and an object of the invention is to provide an armature of an electric motor that provides a maximum space for winding without causing an increase of the magnetic resistance and reduction of the coil space factor.

Means for Solving the Problem

An armature of an electric motor according to the present invention comprises a stator core including a stator yoke wherein a plurality thereof forms a substantially annular shape, and a tooth that protrudes inwardly from a middle portion of the stator yoke toward a center axis of the stator yoke; an insulator formed corresponding to the yoke and the tooth of the stator core, the insulator having projections provided at locations corresponding to both side ends of a front portion of a protrusion of the tooth, and also having, at roots of the projections, side end grooves located along both side ends of the front portion of the tooth protrusion; and an insulation film that covers an inner wall of the stator yoke and a side wall of the tooth, the insulation film being fittingly fixed to the groove by a pair of the insulators sandwiching both ends in an axial direction of the stator core.

Advantageous Effects of the Invention

According to the present invention, an insulation film is retained in a position where the space factor of a coil in the neighborhood of the front portion of a tooth protrusion is not influenced, thereby providing adequate electric insulation without causing an increase of the magnetic resistance and reduction of the coil space factor.

PREFERRED EMBODIMENT FOR CARRYING OUT THE INVENTION

Various embodiments of an electric motor armature according to the present invention will be described below with reference to the figures.

Figure 1:
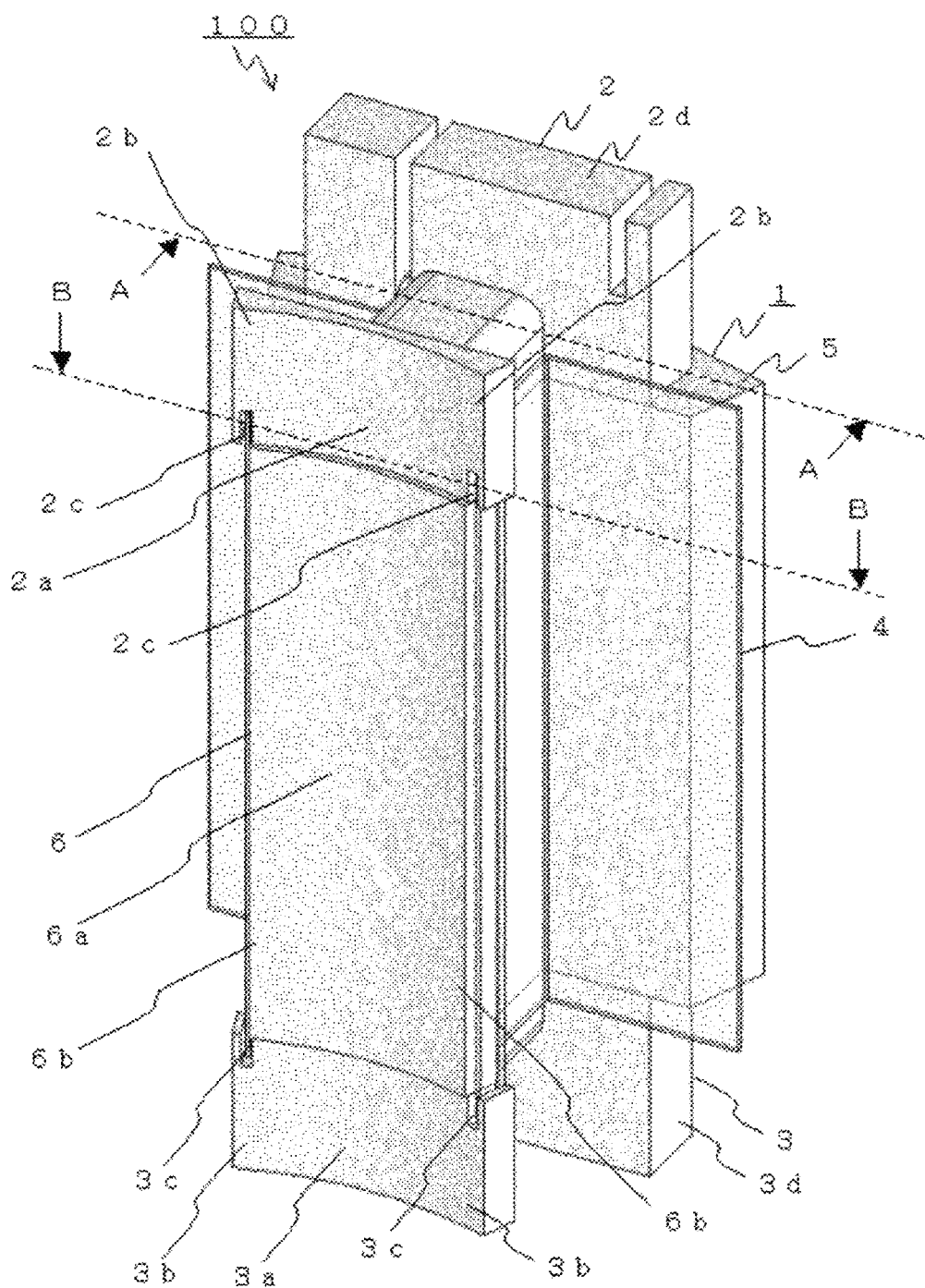
FIG. 1 is a perspective view illustrating a configuration of an armature of an electric motor, according to Embodiment 1 of the present invention.
Figure 2:
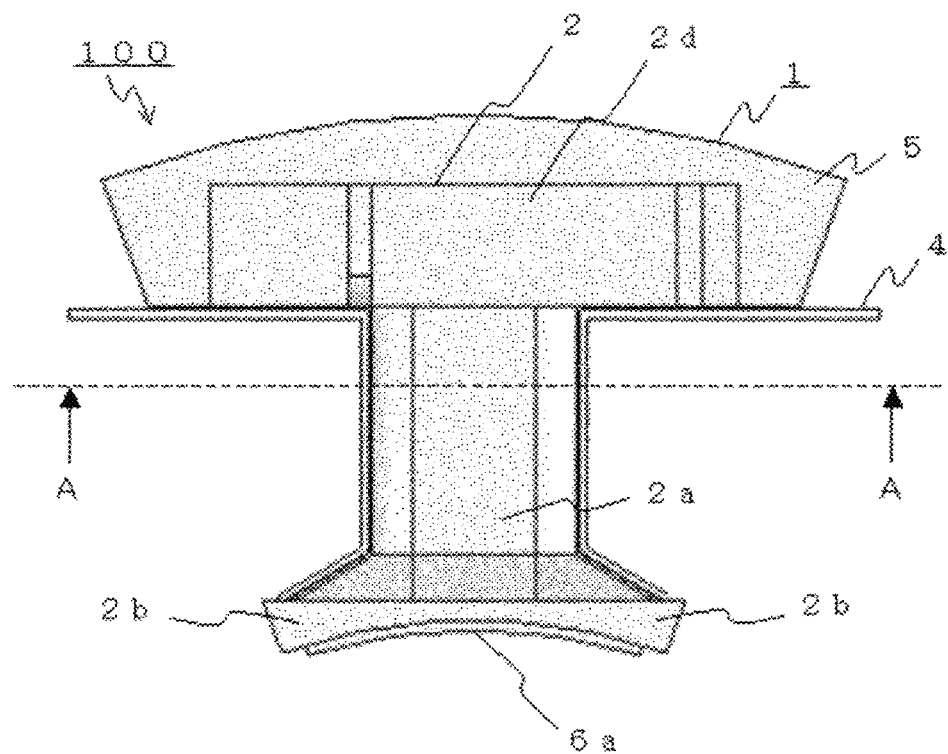
FIG. 2 is a top view illustrating the configuration of the armature of the electric motor, according to Embodiment 1 of the present invention.
Figure 3:
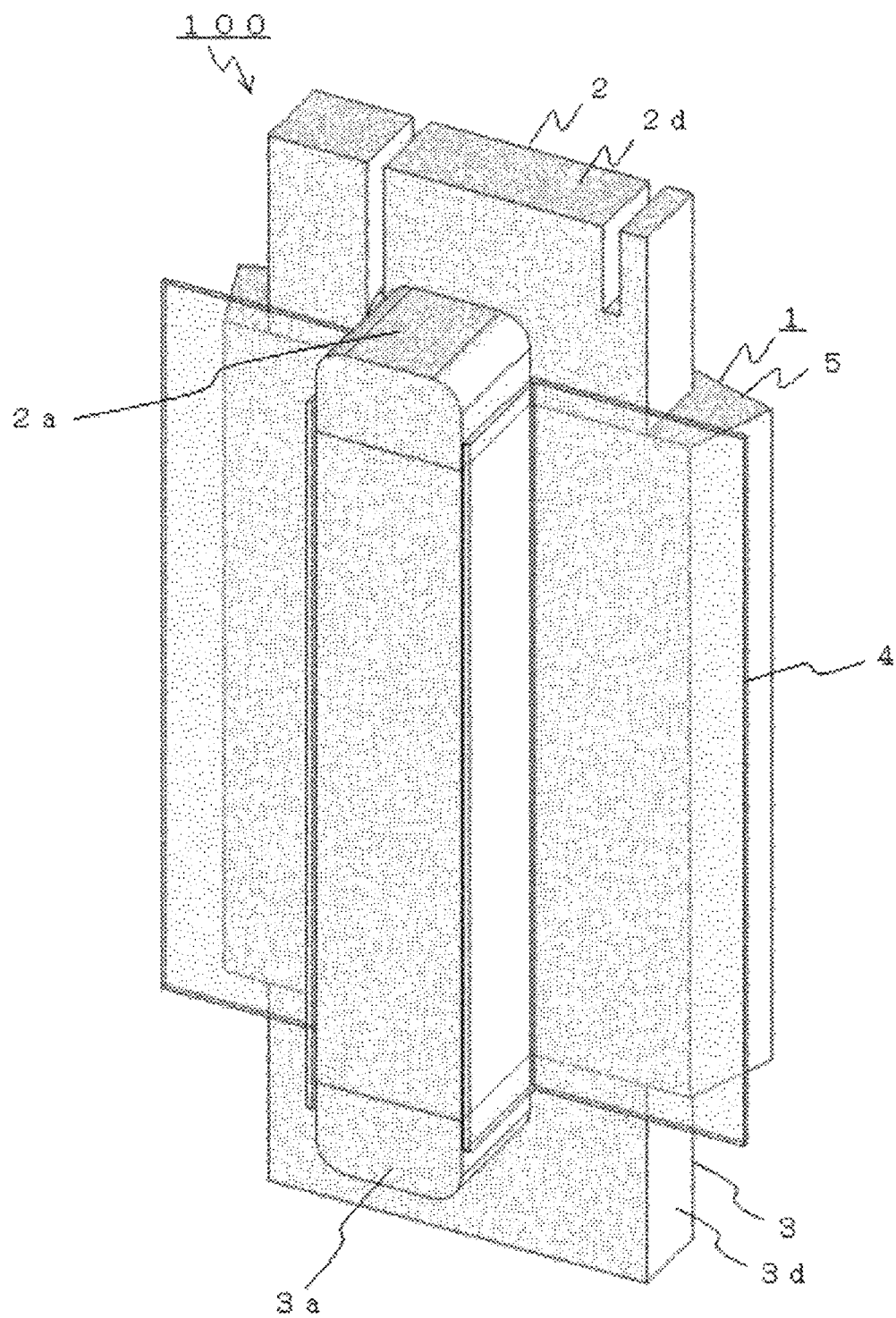
FIG. 3 is a perspective vertical cross-sectional view illustrating the configuration of the armature of the electric motor, according to Embodiment 1 of the present invention.
Figure 4:
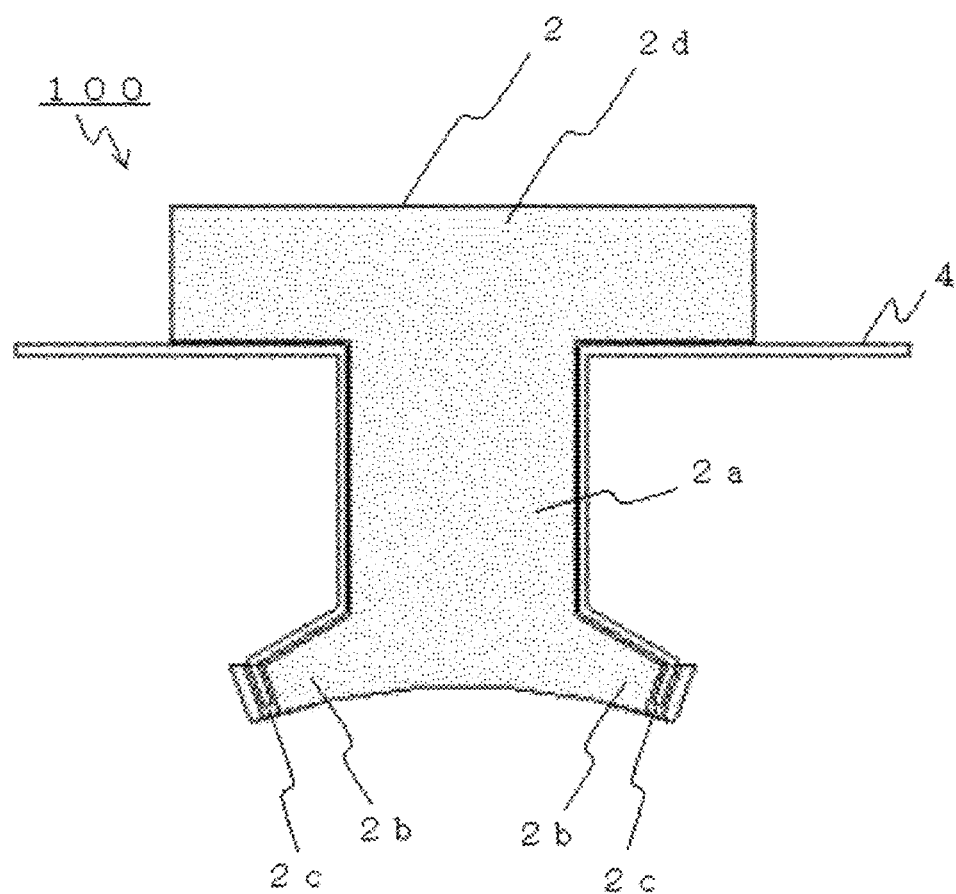
FIG. 4 is a horizontal cross-sectional view illustrating the configuration of the armature of the electric motor, according to Embodiment 1 of the present invention.

FIG. 1 is a perspective view of an armature 100 of an electric motor according to Embodiment 1 of the present invention; FIG. 2 is a top view thereof; FIG. 3 is a perspective cross-sectional view taken along dotted lines A-A in FIG. 1; and FIG. 4 is a plan view showing a cross-section taken along dotted lines B-B in FIG. 1. Winding is not shown in the figures.

The armature 100 is constituted with a stator core 1, an insulator on the connection side, 2, and an insulator on the opposite side of connection, 3, serving as insulators that sandwich both ends of the stator core 1 therebetween, a film insulator 4 serving as an insulation film provided on a side wall of a portion where winding is mounted on the stator core 1.

The stator core 1 is made up of a stator yoke 5 and a tooth 6, a plurality of which is coupled to form a substantially annular shape; the tooth 6 is protruded from the middle portion of the stator yoke 5, inwardly toward the center of the annular shape. A tooth front shoe 6b is provided at both ends of a protrusion 6a. The stator core 1 is laminated with T-shaped magnetic steel plates.

Corresponding to the stator core 1, the connection-side insulator 2 is made up of a protrusion of a tooth 2a and a stator yoke 2d, and a tooth front shoe 2b is provided at both ends of a protrusion of the tooth 2a.

The tooth front shoe 2b projects more than the tooth front shoe 6b of the stator core 1, and a groove 2c is provided as a side end groove, along both sides of the tooth front shoe 6b of the stator core 1, at a root of the projection.

Likewise, corresponding to the stator core 1, the opposite-side-of-connection insulator 3 is made up of a protrusion of a tooth 3a and a stator yoke 3d, and a tooth front shoe 3b is provided at both ends of a protrusion of the tooth 3a.

Likewise, the tooth front shoe 3b protrudes more than the tooth front shoe 6b of the stator core 1, and grooves 3c are provided along the both side ends of the tooth front shoe 6b of the stator core 1, at the root of the protrusion.

The film insulator 4 which covers an inner wall of the stator yoke 5 and a wall on the tooth side is held by the fact that both ends in an axial direction of the end portions of the film insulator 4 are sandwiched between and fitted into the grooves 2c and 3c.

The grooves 2c and 3c, which hold both ends in the axial direction of the end portions of the film insulator 4, are provided in positions where the coil space factor is not affected and the respective tooth front shoes 2b and 3b adjacently face to each other.

In Embodiment 1, as described above, the grooves 2c and 3c, which hold both ends in the axial direction of the end portions of the film insulator 4, are provided at respective locations where the tooth front shoes 2b and 3b adjacently face to each other. Consequently, the fact that the projection of insulator enters within a slot enables coils to be uniformly wound without reducing a winding space of the coil and causing a shift in position of the end of the film insulator in the circumferential direction relative to the stator core.

Further, forming the insulator according to the invention this way enables maximum effective use of the winding space, and thereby the improved coil space factor can lead to an electric motor with high efficiency.

Embodiment 2

Figure 5:
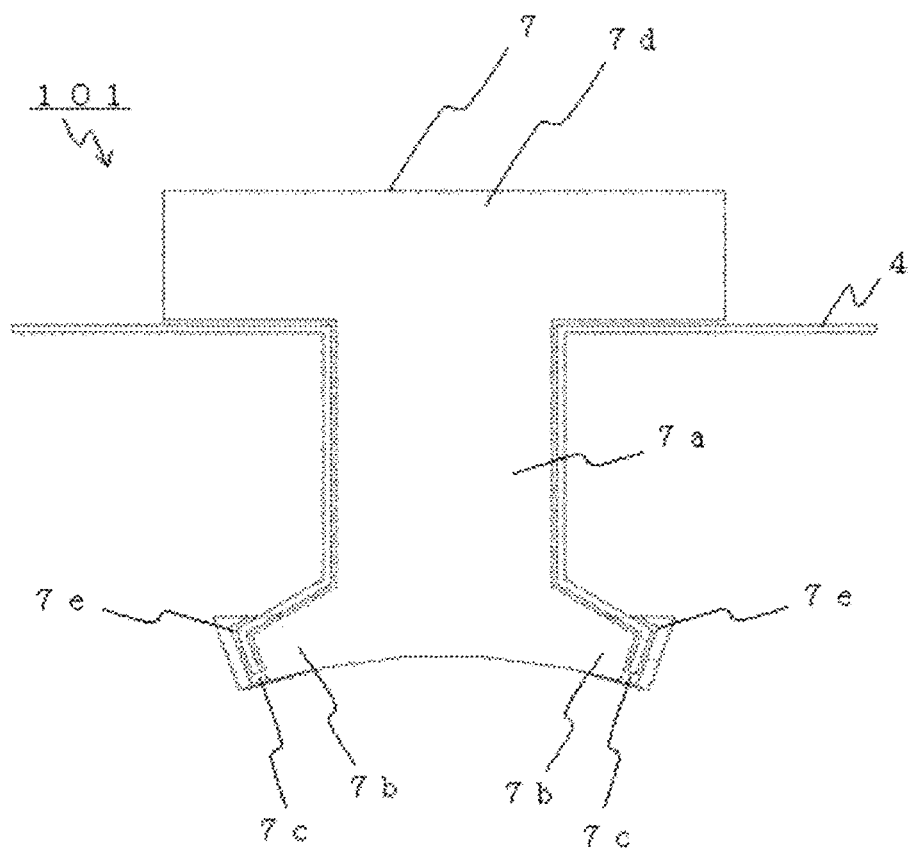
FIG. 5 is a horizontal cross-sectional view illustrating a configuration of an armature of an electric motor, according to Embodiment 2 of the present invention.

As with the plan view (FIG. 2) showing a cross section taken along dotted lines B-B in the perspective view (FIG. 1) of the armature 100, FIG. 5 is a plan view showing a cross section at the same position (a position taken along dotted lines B-B) of an armature 101 of an electric motor according to Embodiment 2. Referring to FIG. 5, a bend portion 7e is provided to a groove 7c of an insulator on the connection side, 7.

Likewise, albeit not shown, a bend portion 8e is provided to a groove 8 of an insulator on the opposite side of connection, 8. As the configuration with other parts is the same as that in Embodiment 1, the corresponding parts are labeled with the same reference numerals, and their descriptions are not provided herein.

As described above, in Embodiment 2, since the bend portions 7e and 8e are provided to the grooves 7c and 8c, respectively, an advantageous effect is that not only does the film insulator fitted into the groove be prevented from shifting in the circumferential direction relative to the stator core, but also the bend portions, acting as constraints, prevent the film insulator from shifting in a radial direction relative to the stator core. This can serve to stabilize the displacement of the film insulator likely to occur while winding the coil, and avoid a winding failure.

Embodiment 3

Figure 6:
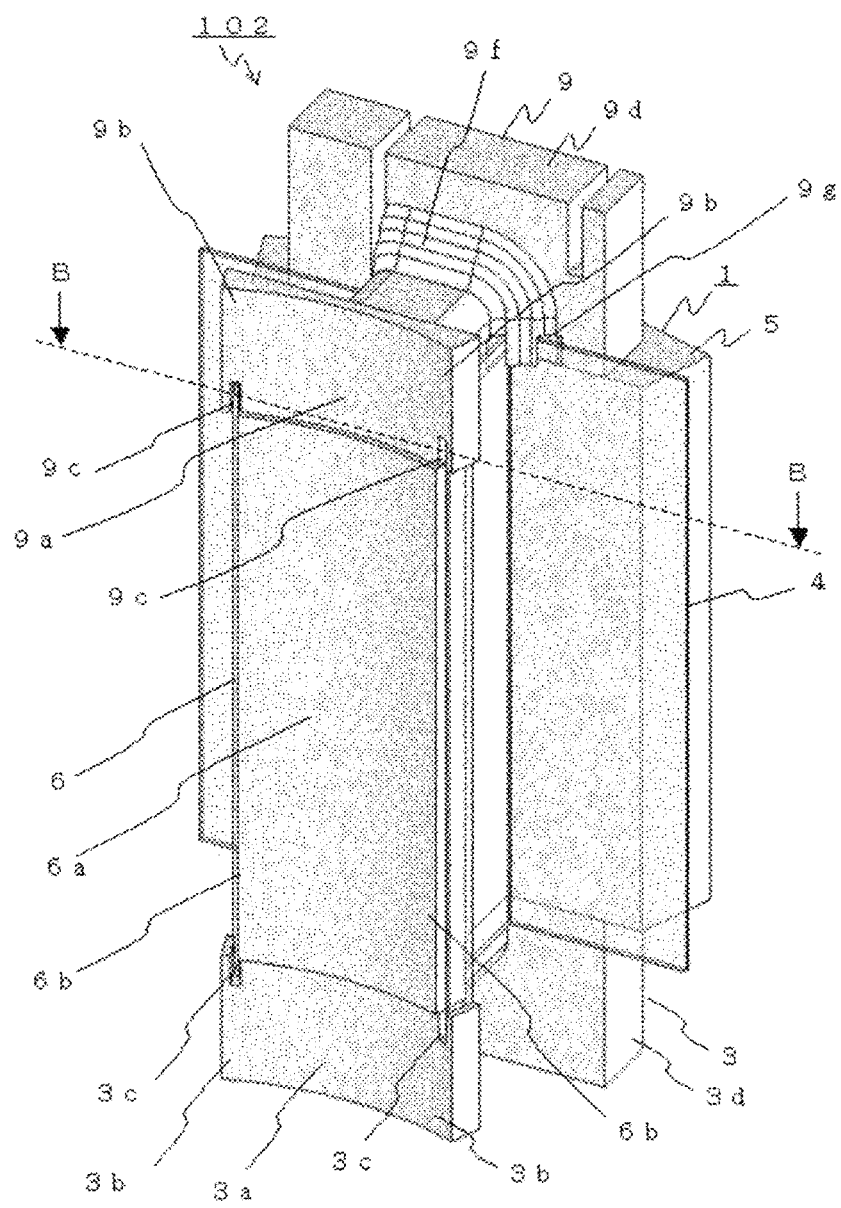
FIG. 6 is a perspective view illustrating a configuration of an armature of an electric motor, according to Embodiment 3 of the present invention.
Figure 7:
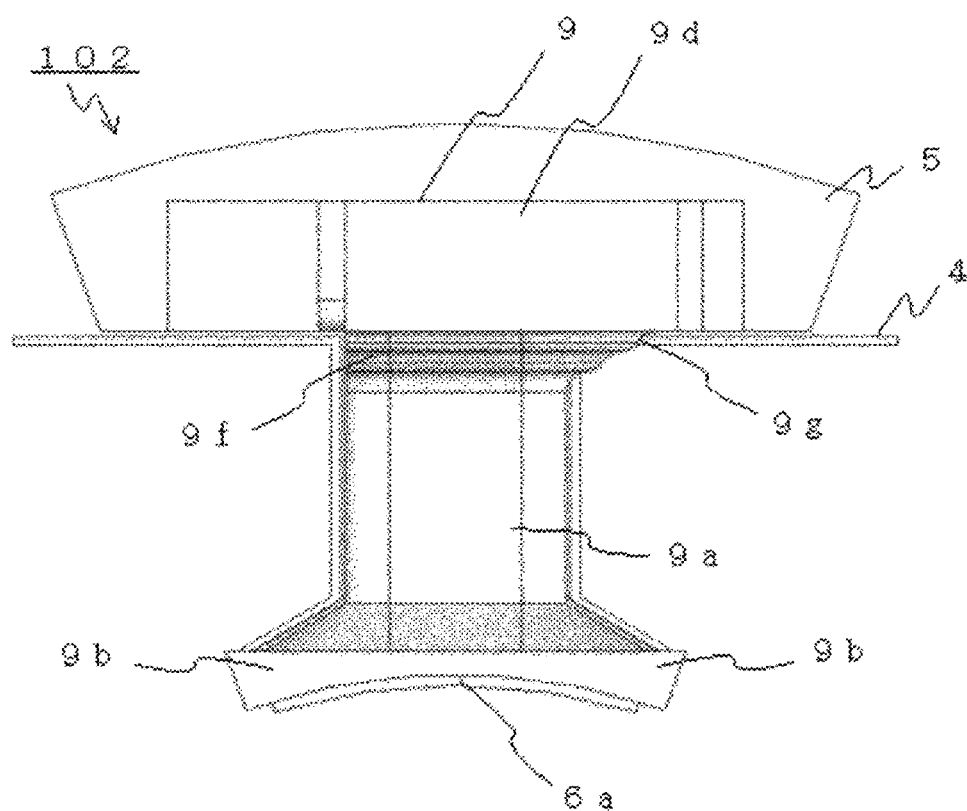
FIG. 7 is a top view illustrating the configuration of the armature of the electric motor, according to Embodiment 3 of the present invention.
Figure 8:
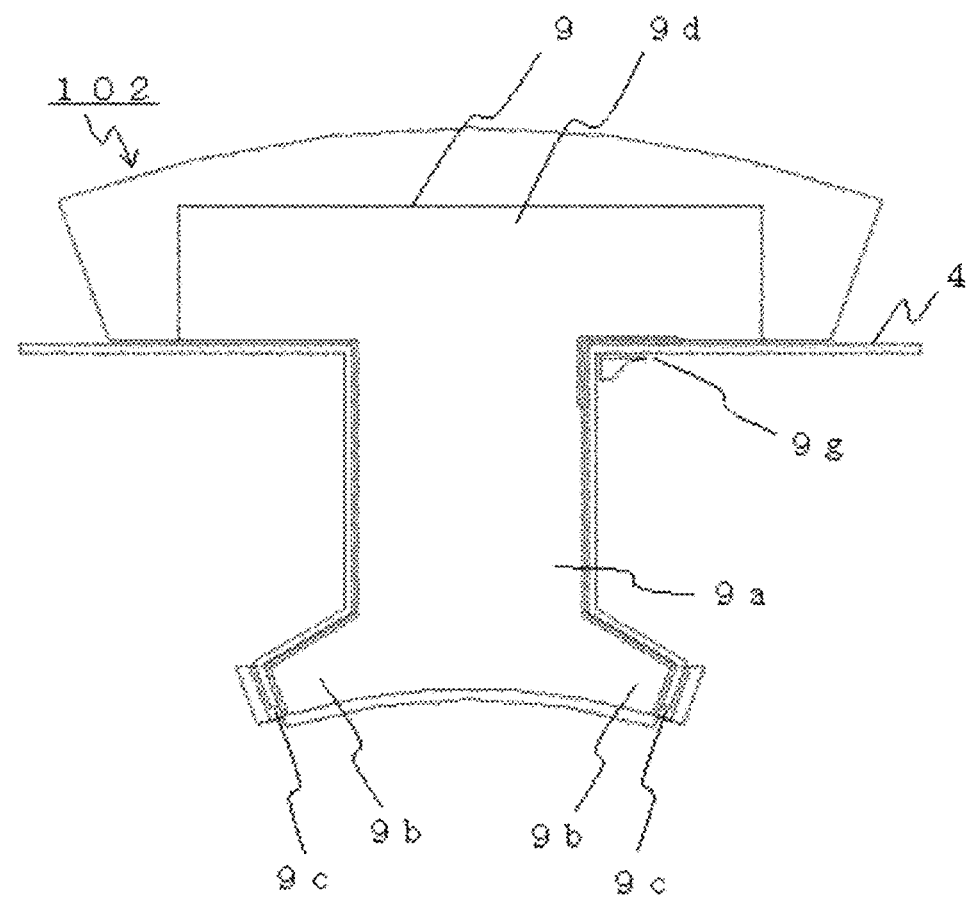
FIG. 8 is a horizontal cross-sectional view illustrating the configuration of the armature of the electric motor, according to Embodiment 3 of the present invention.

FIG. 6 is a perspective view of an armature 102 of an electric motor according to Embodiment 3 of the present invention; FIG. 7 is a top view thereof; and FIG. 8 is a top view showing a cross section taken along dotted lines B-B in FIG. 6.

In Embodiment 3, when a regular winding by longitudinal cross winding—in which a coil winding transitions from lower layer to upper layer on the side surface of the tooth—is used as a coil winding method, a groove 9g, serving as a root groove, is provided also in a dummy coil 9f provided for the purpose of the regular coil winding, and the film insulator 4 is fitted into the groove 9g.

As the configuration with other elements is the same as that in Embodiment 1, the corresponding elements are labeled with the same reference numerals, and their descriptions are not provided herein.

In Embodiment 3, as described above, the groove 9g is provided in the dummy coil 9f, and the film insulator 4 is retained at maximum at three places per tooth including grooves 9c and 3c provided at two places in the neighborhood of the respective tooth front shoe, thus improving the stability of retaining the film insulator.

The groove 9g, provided in the dummy coil 9f, serves to retain the film insulator 4 using only a tooth 9a of an insulator on the connection side, 9, and the side of a stator yoke 9d; however, the invention is not limited to this method.

Figure 9:
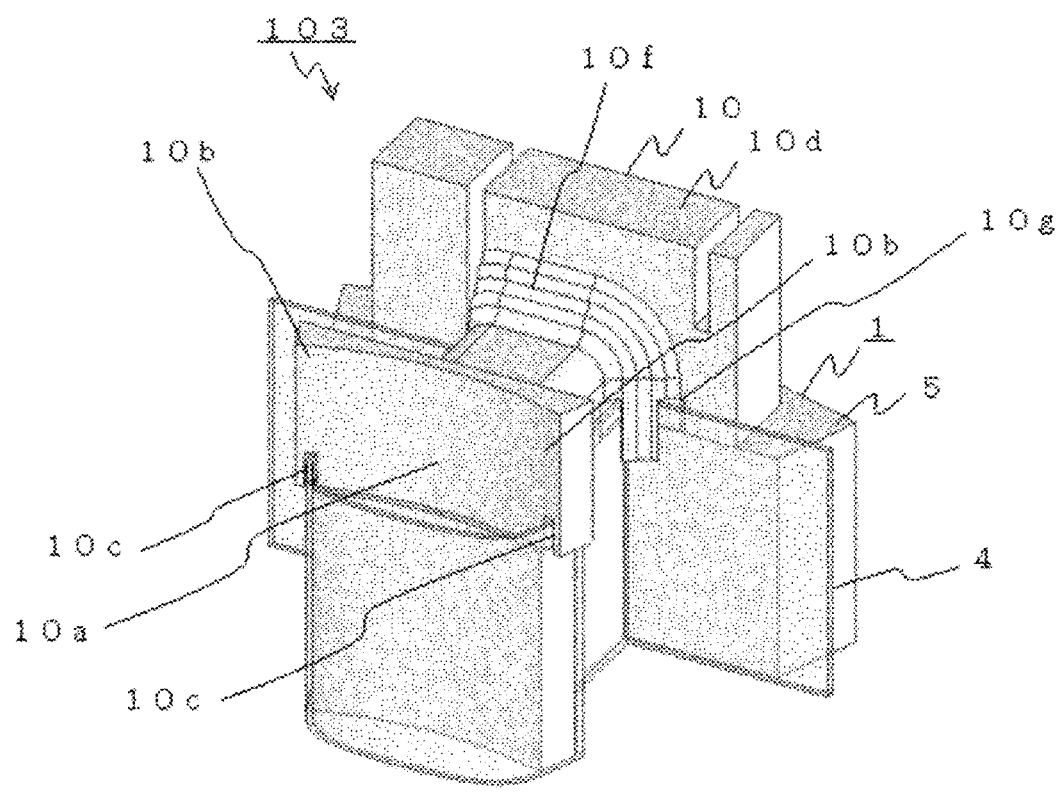
FIG. 9 is a fragmentary perspective view illustrating a configuration of another armature of the electric motor, according to Embodiment 3 of the present invention.

For example, as shown in FIG. 9, a dummy coil 10f, provided to an insulator 10 on the connection side, may be extended downward from the end of the stator core 1. In this case, a groove 10g can be of double supporting structure such that the film insulator is supported by an extended portion of the dummy coil 10f, and by not only the tooth 10a of the connection-side insulator 10 and the side of the stator yoke 10d, but also the tooth 6 of the stator core 1 and the side of the stator yoke 5.

This achieves an advantage effect in improving rigidity of the grooved dummy coil, thickness of which extended portion becomes smaller.

Embodiment 4

Figure 10:
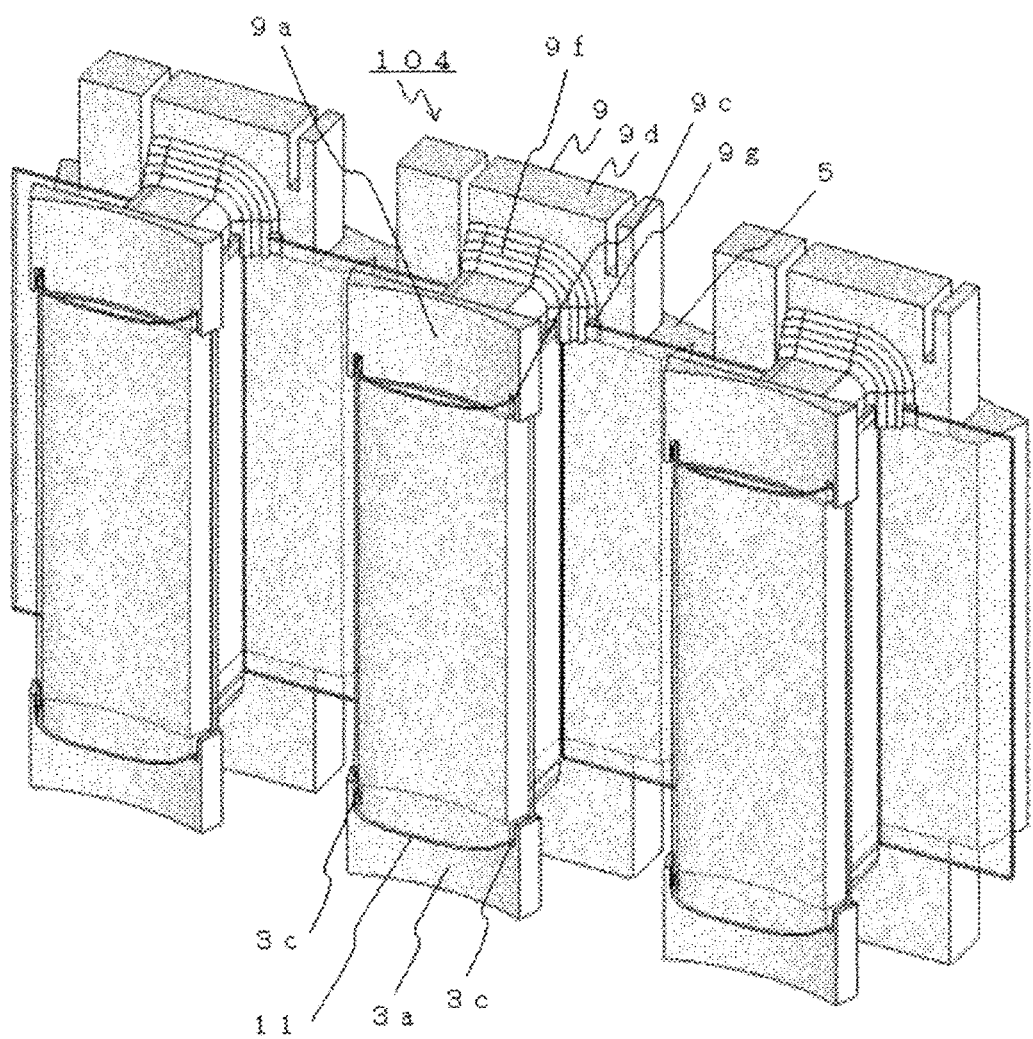
FIG. 10 is a perspective view illustrating a configuration of an armature of an electric motor, according to Embodiment 4 of the present invention.
Figure 11:
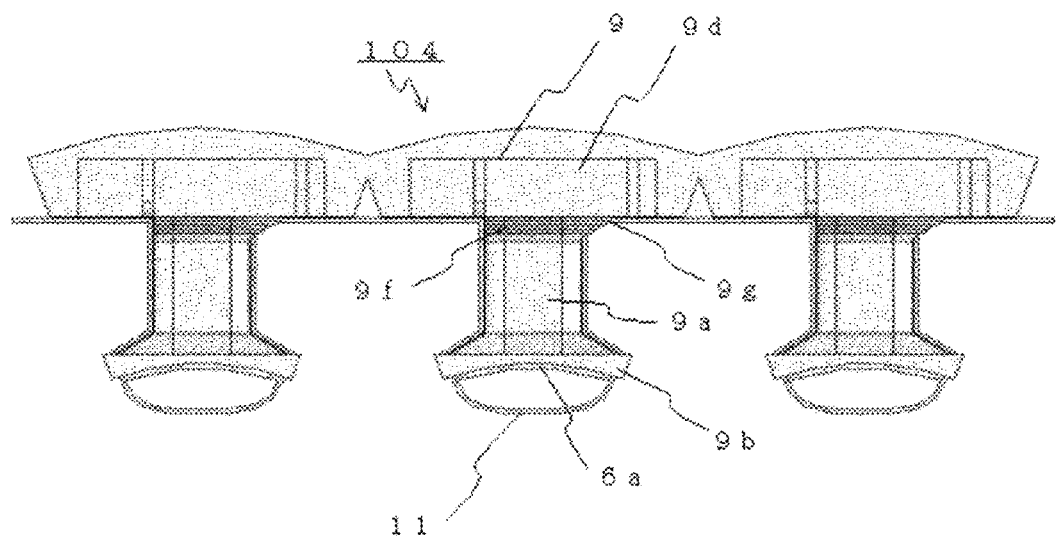
FIG. 11 is a top view illustrating the configuration of the armature of the electric motor, according to Embodiment 4 of the present invention.
Figure 12:
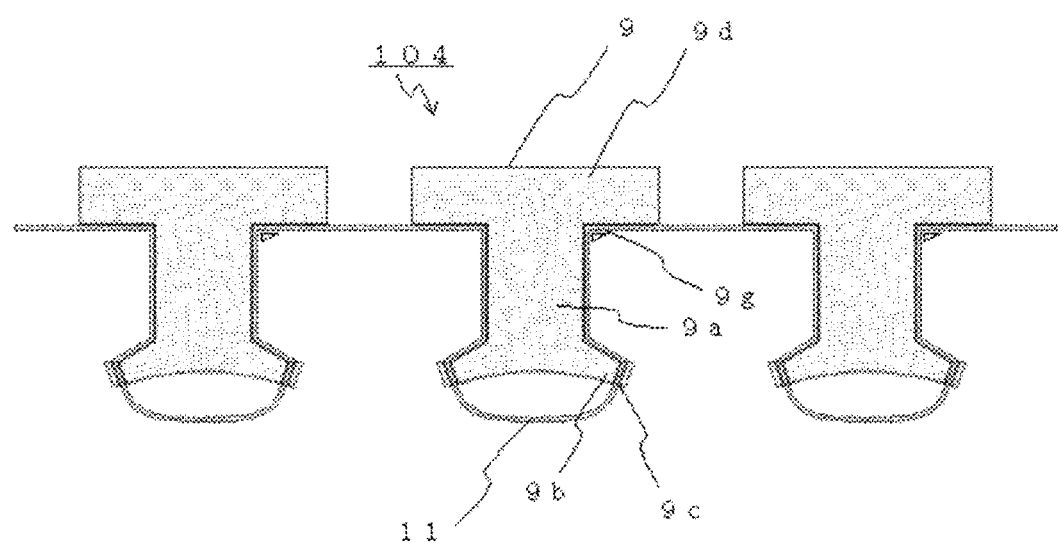
FIG. 12 is a horizontal cross-sectional view illustrating the configuration of the armature of the electric motor, according to Embodiment 4 of the present invention.
Figure 13:
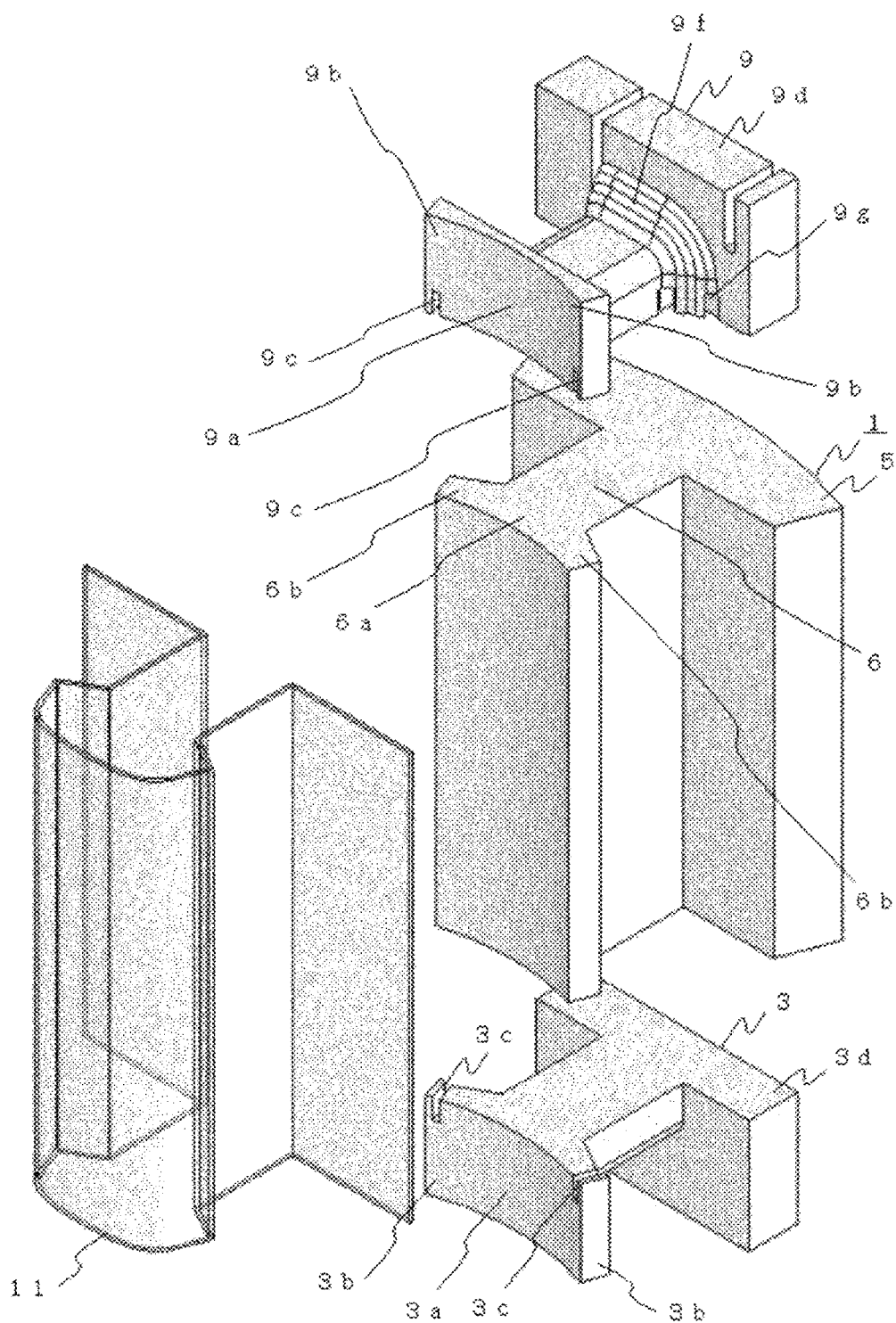
FIG. 13 is an exploded perspective view illustrating the configuration of the armature of the electric motor, according to Embodiment 4 of the present invention.

FIG. 10 is a perspective view of an armature 104 of an electric motor according to Embodiment 4. FIG. 11 is a top view thereof. As with the plan view (FIG. 2) showing a cross section taken along dotted lines B-B in the perspective view (FIG. 1) of the armature 100, FIG. 12 is a plan view showing a cross section at the same position (a position taken along dotted lines B-B) of the armature 104 in FIG. 10. FIG. 13 is an exploded perspective view of one segment thereof.

In Embodiment 4, the film insulator, fitted into the groove, is extended over a front surface of the tooth, and a film insulator 11 is extended continuously between adjacent slots. As the configuration with other elements is the same as that in Embodiment 3, the corresponding elements are labeled with the same reference numerals, and their descriptions are not provided herein.

In Embodiment 4, as described above, the film insulator 11, which passes over the front surface of the tooth, are extended continuously. Consequently, the film insulator, made up of a single sheet, provides electric insulation of the stator core having a plurality of teeth.

Further, because the film insulator extends over the front surface of the tooth while winding the coil, an advantageous effect is that the insulation failure is reduced such that the film insulator is peeled off from the front surface in the neighborhood of the tooth front shoe or is caught in the coil during coil winding.

This enables reduction of poor quality of the coil winding, and also reduction of the investment cost of manufacturing facilities because of no jig being needed for pressing the film insulator during winding of the coil.

Figure 14:
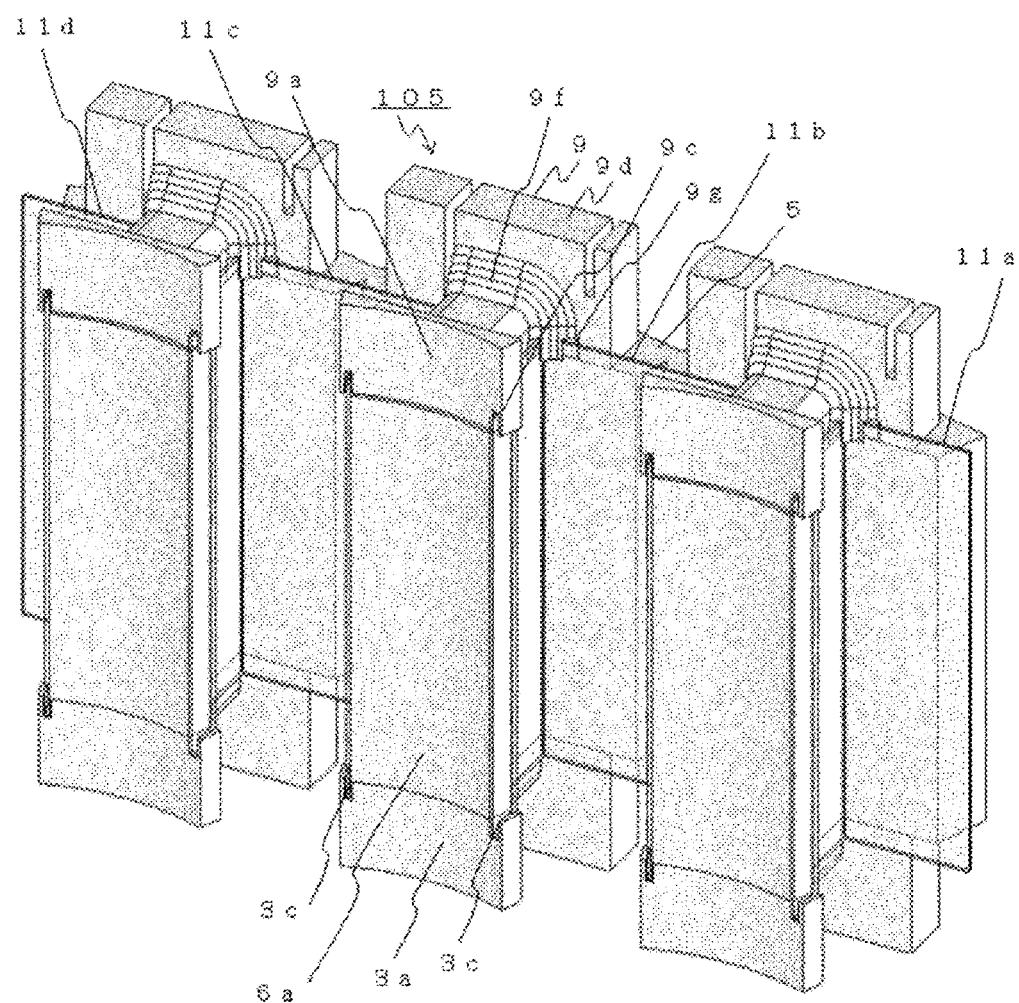
FIG. 14 is a perspective view illustrating a configuration of another armature of the electric motor, according to Embodiment 4 of the present invention.

After the stator core 1 has been electrically insulated and the coil has been wound, the film insulator 11 may remove its portion extending over the front surface of the protrusion 6a of the tooth 6, as shown in FIG. 14. This removal can avoid a quality problem with respect to interference of the film insulator with the rotator core.

Figure 15:
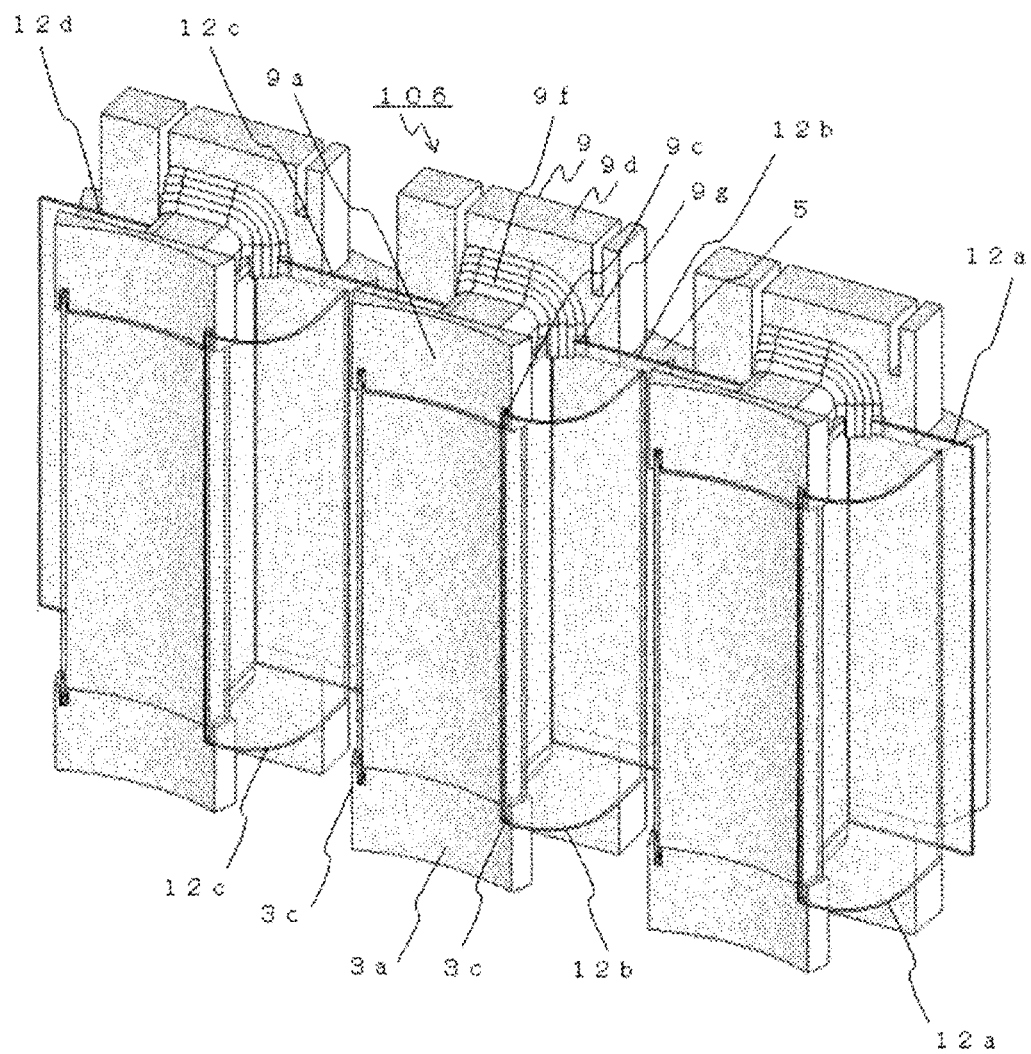
FIG. 15 is a perspective view illustrating a configuration of still another armature of the electric motor, according to Embodiment 4 of the present invention.

Further, after the coil has been wound, a film insulator 12, which extends over the front surface of the protrusion 6a of the tooth 6, may be partially cut away, and, as shown in FIG. 15, the film insulators may be extended to enter into spaces between the coils wound on the adjacent teeth. The film insulator, if cut away in its middle portion, may enter into spaces between coils wound on both adjacent teeth.

In this case, the film insulator, which enters into spaces between the winding coils mounted on the adjacent teeth, can act as an inter-phase insulation. This can prevent a short circuit between winding coils of the adjacent teeth, or reduce in a post process a step of inserting another film insulator between the winding coils.

In the present embodiment, as described above, the armature is used having no stepped shape at both end surfaces in the axial direction of the tooth 6 of the stator core 1; however, the invention is not limited to this construction.

Figure 16:
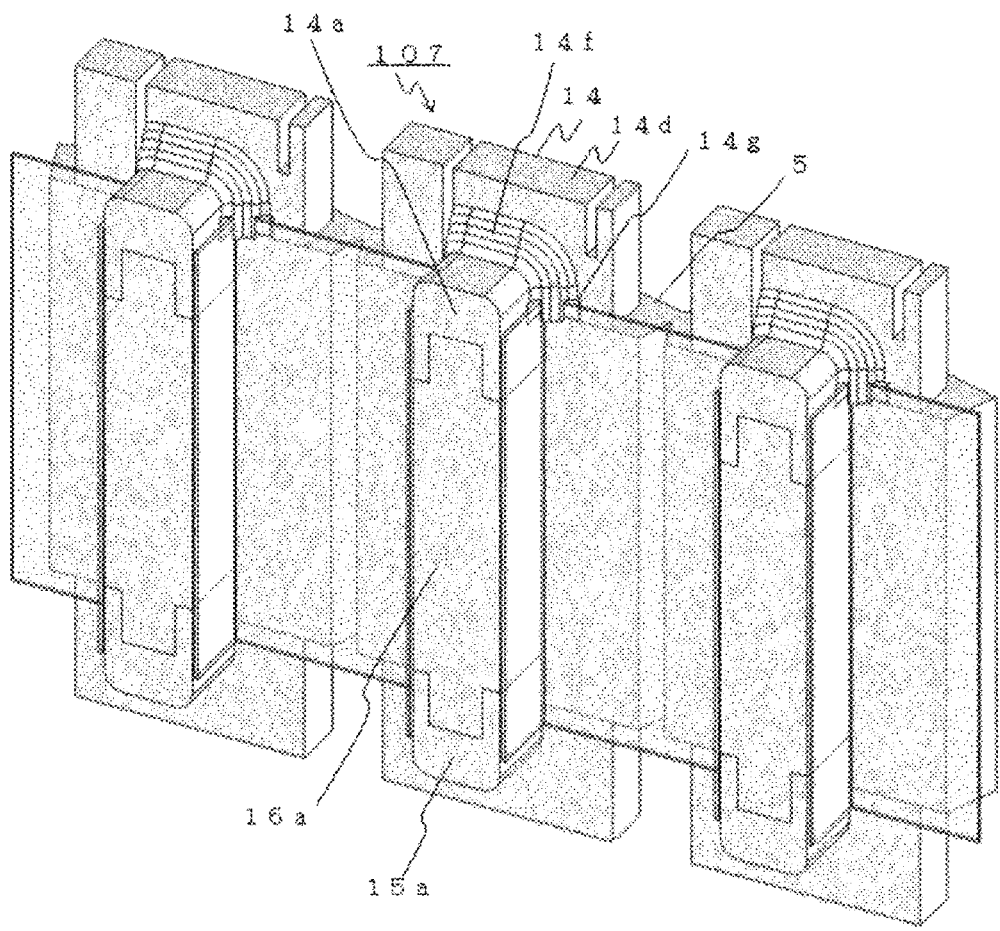
FIG. 16 is a perspective view illustrating a configuration of yet still another armature of the electric motor, according to Embodiment 4 of the present invention.

As shown in FIG. 16, fittingly fixed together are a tooth 16a of the stator core 1—whose both end surfaces in a axial direction are formed into stepped surfaces where a predetermined length of the tooth 16a is narrowed—and teeth 14a and 15a of an insulator 14 on the connection side, and an insulator 15 on the opposite side of connection, respectively. Even if the foregoing construction is used in doing this, an advantageous effect is obtained in that the coil space factor is improved.

Further, in any one of the forgoing embodiments, in the fabrication step which is not included in the winding step, a film insulator, serving as an inter-phase insulation film is inserted into a space between the winding coils of the adjacent teeth, and, whereby the advantageous effect is increased in that the winding short circuit is prevented.

REFERENCE NUMERALS

1 Stator core
2, 7, 9, and 14 Insulator on connection side
2a, 7a, 9a, and 14a Tooth of connection-side insulator
2b, 7b, 9b, and 14b Tooth front shoe of connection-side insulator
2c, 7c, 9c, and 14c Groove of connection-side insulator
3 and 8 Insulator on opposite side of connection
3a and 8a Tooth of opposite-side-of-connection insulator
3 and 8 Tooth-top shoe of opposite-side-of-connection insulator
3 and 8 Groove of opposite-side-of-connection insulator
4, 11, 11a, 11b, 11c, 11d, 12, 12a, 12b, 12c and 12d Film insulator
5 Stator yoke
6 Tooth of stator core
6a Protrusion of tooth of stator core
6b Tooth-front shoe of stator core
7e and 8e Bend portion
9f and 10f Dummy coil
9g Groove
100, 101, 102, 103, 104, 105, 106 and 107 Armature

What is claimed is:

1. An armature of an electric motor, comprising:
 a stator core including
   a stator yoke wherein a plurality thereof forms a substantially annular shape, and
   a tooth that protrudes inwardly from an inner wall of the stator yoke toward a center axis of the stator yoke, the tooth including a front portion opposite the stator yoke, the front portion having a tooth protrusion including an outer wall facing the inner wall of the stator yoke, and the tooth including a side wall extending from the stator yoke to the front portion;
 an insulator formed corresponding to the stator yoke and the tooth of the stator core, the insulator extending from the stator yoke toward the center axis of the stator yoke via a stem portion, and including at an end of the stem portion opposite the stator yoke two insulator protrusions protruding beyond respective sides of the stem portion, each insulator protrusion having an insertion groove; and
 an insulation film including at least a first portion that covers the inner wall of the stator yoke, a second portion that covers the side wall of the tooth, a third portion that covers the outward facing wall of the tooth protrusion, being and a fourth portion folded from the third portion to be fittingly fixed inside the insertion groove of one of the insulator protrusions.

2. The armature of an electric motor of claim 1, wherein each insertion groove has a bend portion.

3. The armature of an electric motor of claim 1, wherein a dummy coil is further provided to the insulator, at a location corresponding to a root of the tooth, and a root groove where the insulation film is fittingly fixed is provided to the dummy coil.

4. The armature of an electric motor of claim 3, wherein the dummy coil is provided so that, when the stator core is sandwiched between a pair of the insulators, a slit clearance is formed between part of the root groove and side walls of the stator core.

5. The armature of an electric motor of claim 1, wherein the insulator and the stator core have their stepped portions that fit into their corresponding end portions.

6. The armature of an electric motor of claim 1, wherein a single sheet of the insulation film covers at least a single tooth.

7. The armature of an electric motor of claim 6, wherein the film is split or removed between both side ends of the front portion of the protrusion of the tooth covered with the single sheet of the insulation film.

8. The armature of an electric motor of claim 7, wherein when the plurality of the stator cores forms a substantially annular shape, a portion of the split insulation film, corresponding to the portion present between both side ends of the front portion of the protrusion of the tooth, is placed between the adjacent teeth.

9. The armature of an electric motor of claim 1, wherein when the plurality of the stator cores forms a substantially annular shape, an inter-phase insulation film is placed between adjacent teeth.

10. The armature of an electric motor of claim 1, further comprising a second insulator including the features of the first insulator, and the insulation film is fittingly fixed inside each of the insertion grooves of the two insulator protrusions of each insulator by the two insulators sandwiching both ends of the stator core in an axial direction of the stator core.

\* \* \* \* \*